Patented Feb. 24, 1953

2,629,733

UNITED STATES PATENT OFFICE 2,629,733

N-OXYALKYL-p-AMINOBENZOATES

David I. Weisblat, Barney J. Magerlein, Donald R. Myers, Stanley T. Rolfson and Arthur R. Hanze, Kalamazoo, Mich., assignors to The Upjohn Company, Kalamazoo, Mich., a corporation of Michigan No Drawing. Application July 31, 1948, Serial No. 41,884

8 Claims. (Cl. 260—470)

This invention relates to certain N-propyl-p-aminobenzoate compounds containing substituents in the propyl radical, particularly to compounds containing constituents on both the second and third carbon atoms of the propyl radical, and to intermediates and methods useful in their preparation.

The compounds of the invention herein defined as the "N-(3-oxy-2-hydroxypropyl)-p-aminobenzoate compounds" have the generic formula

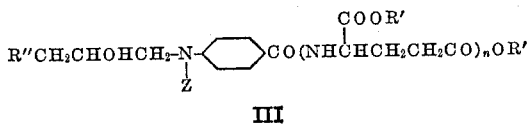

III

*N-(3-oxy-2-hydroxypropyl)-p-aminobenzoate compound* wherein R' is from the group consisting of hydrogen and the alkyl radicals, Z is from the group consisting of hydrogen and the arylsulfonyl radicals, n is from the group consisting of zero and the positive integers 1 to 7, inclusive, and R'' is selected from the group consisting of radicals having the formulae HO—, HCOO—, alkyl-COO—, aryl-COO—, alkyl-O—, aryl-O— and aralkyl-O—.

Compounds useful as starting materials for the preparation of compounds of the invention, herein defined as the "N-(3-halo-2-hydroxyl-propyl)-p-aminobenzoate compounds," are compounds having the formula

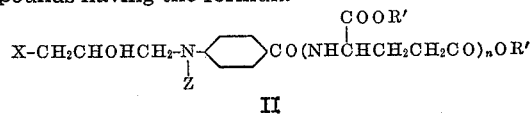

II

*N-(3-halo-2-hydroxypropyl)-p-aminobenzoate compound* wherein X is a halogen from the group consisting of chlorine, bromine and iodine and R', n and Z have the values given.

Intermediate compounds useful in the preparation of compounds of the invention herein, defined as the "N-(2,3-epoxypropyl)-p-aminobenzoate compounds," are compounds having the formula

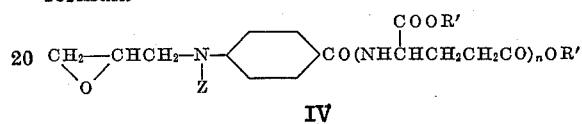

IV

*N-(2,3-epoxypropyl)-p-aminobenzoate compound* wherein R', n and Z have the values given.

Another method for preparing the compounds of the invention is described and claimed in a concurrently filed co-pending application, Serial No. 41,890.

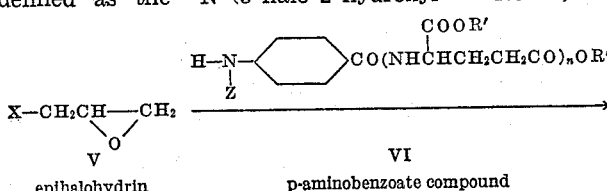

V  
epihalohydrin

VI  
p-aminobenzoate compound

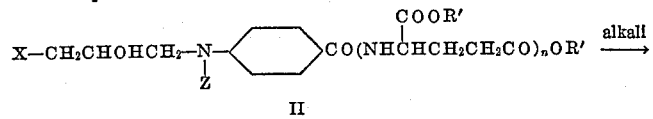

II  
N-(3-halo-2-hydroxypropyl)-p-aminobenzoate compound

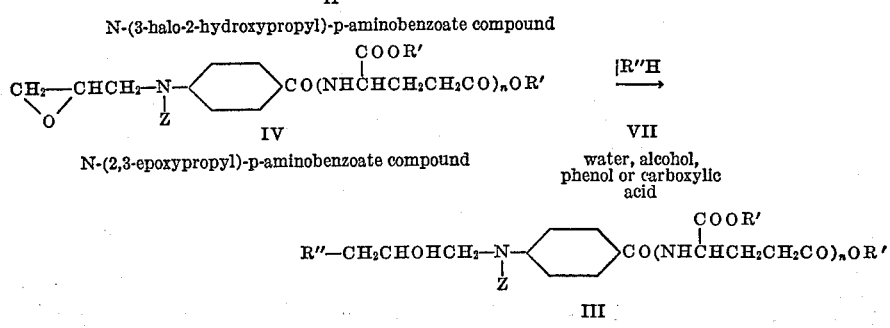

IV  
N-(2,3-epoxypropyl)-p-aminobenzoate compound

VII  
water, alcohol, phenol or carboxylic acid

III  
N-(3-oxy-2-hydroxypropyl)-p-aminobenzoate compound

The compounds of the invention can be prepared readily, as indicated in the accompanying diagram, by first reacting an epihalohydrin (V), i. e. epichlorohydrin, epibromohydrin or epiiodohydrin, with a p-aminobenzoate compound (VI), prepared as hereinafter described, to form an N-(3-halo-2 - hydroxypropyl) - p -aminobenzoate compound (II). The latter compound is then treated with an alkali to remove hydrogen halide from the molecule and form an N-(2,3-epoxypropyl)-p-aminobenzoate compound (IV) which is then treated with water, an alcohol, a phenol or a carboxylic acid, i. e. with a compound having the formula R"H (VII) wherein R" has the values previously given, to form an N-(3-oxy-2-hydroxypropyl) - p - aminobenzoate compound (III).

Many of the compounds of the invention are well defined crystalline substances soluble in alcohol and ether and in many other common organic liquids. Certain of the intermediate compounds are light colored oils or syrupy liquids as will be apparent from the appended examples. The amino acids and esters form addition salts with acids which are soluble in water while the arylsulfonylamnio acids and esters are only sparingly soluble in water. The amino acids and esters also form quaternary ammonium compounds with alkyl halides.

In the naming of the compounds of the invention and of other compounds mentioned herein when both a glutamic acid residue and a p-aminobenzoic acid and residue are included in the molecule the nitrogen atom of the glutamic acid residue is, for convenience, herein referred to by the symbol "N'" and the nitrogen atom of the p-aminobenzoic acid nucleus is referred to by the symbol "N". In the structural formulae given herein and in the appended claims aromatic nuclei are represented by one or more simple hexagons.

The N-(3 - halo - 2 - hydroxypropyl)-p-aminobenzoate compounds and the N - (2,3 - epoxypropyl)-p-aminobenzoate compounds) are valuable as intermediates in the preparation of the N - (3 - oxy-2-hydroxypropyl)-p-aminobenzoate compounds which are, in turn, useful as intermediates in the preparation of certain compounds referred to broadly in the art as "folic acids". Thus, as described and claimed in a concurrently filed copending application, Serial No. 41,889, diethyl N'-(N-3-methoxy-2-hydroxypropyl)-p-toluene-sulfonyl-p-aminobenzoyl) - glutamate can be oxidized, e.g. with chromic acid, to form diethyl N'-(N-(3 - methoxy-2-ketopropyl)-p-toluenesulfonyl-p-aminobenzoyl) - glutamate which can then be condensed with 2,4,5-triamino-6-hydroxypyrimidine, as described and claimed in a concurrently filed co-pending application, Serial No. 41,882, and now U. S. Patent No. 2,558,711, issued June 26, 1951, to form diethyl N'-(N-((2-amino - 4 - hydroxy-6-pteridyl)-methyl)-p-toluenesulfonyl-p-aminobenzoyl)-glutamate. Upon treatment of the latter compound with hydrogen bromide in an aliphatic acid medium to split the p-toluenesulfonyl radical from the molecule, and in the presence of a bromine acceptor to prevent bromination in the benzene nucleus of the aminobenzoic acid residue according to the method described and claimed in a concurrently filed co-pending application, Serial No. 41,883, and now U. S. Patent No. 2,562,222, issued July 31, 1951, and after subsequent hydrolysis of the ester groups, there is formed N'-(N-((2-amino-4-hydroxy - 6 - pteridyl)methyl) - p-aminobenzoyl)-glutamic acid (pteroyl-glutamic acid) generally recognized, when the glutamic acid residue has the same configuration as 1(+)-glutamic acid, as being identical with the "L. casei factor" or vitamin B$_c$ from liver.

In similar fashion, other N-(3-oxy-2-hydroxypropyl)-p-aminobenzoate compounds of the invention can be oxidized to the 2-ketopropyl compounds and the latter then condensed with 2,4,5-triamino-6-hydroxypyrimidine to form the corresponding 2 - amino-4-hydroxy-6-pteridyl compounds and the latter then converted to compounds of the folic acid type in the manner just described.

As indicated by the formula given, compounds containing more than one glutamic acid or ester residue contemplated by the invention are those wherein only the gamma-carboxyl groups are involved in the peptide linkages, such as the residues derived from N'-(p-aminobenzoyl)-gamma-glutamylglutamic acid, N' - (p-aminobenzoyl) - gamma - glutamyl-gamma-glutamylglutamic acid, and the like. Preferred compounds of the invention are those wherein $n$ represents the integer 1, i. e. those containing one glutamic acid or ester residue, and the invention will be described with particular reference thereto.

Compounds similar to, or identical with, those of the folic acid group made by using compounds of the invention as intermediates, such as pteroyl-glutamic acid and pteroyl-gamma-glutamyl-gamma-glutamylglutamic acid, which are of greatest value as measured by their biological activity against *Lactobacillus casei* or *Streptococcus fecalis R*, are those wherein the glutamic acid residues possess the same configuration as 1(+)-glutamic acid. However, the invention also contemplates compounds having the dextro configuration as well as racemic mixtures.

Compounds wherein Z of the generic formula given represents an arylsulfonyl radical are of particular value because of the protection afforded the aromatic amino group by the arylsulfonyl group. Compounds having the amino group thus protected are often not subject to decomposition and the formation of by-products when employed as a reactant, e. g. when oxidized with chromic acid, to nearly the same extent as are compounds in which the aromatic amino group is unprotected. Following the carrying out of a reaction using a compound containing such an arylsulfonylamino group, the arylsulfonyl radical can be split readily from the molecule formed, as mentioned previously, by treating the compound with hydrogen bromide in an aliphatic acid medium and in the presence of a bromine acceptor. By such treatment, the arylsulfonyl radical is split from the molecule to give a high yield of the amine and bromination in the benzene nucleus is effectively prevented. The final and intermediate compounds of the present invention wherein Z is an arylsulfonyl radical can also be converted to other compounds of the invention wherein Z is hydrogen by splitting the arylsulfonyl radical from the molecule in the manner just described. Although the invention will be described in the case of arylsulfonyl compounds with particular reference to p-toluenesulfonyl compounds, it is understood that the invention contemplates compounds and intermediates containing other arylsulfonyl radicals, such as the o-toluenesulfonyl, benzenesulfonyl, and naphthalenesulfonyl radicals as well as many others. Arylsulfonyl radicals having substituents, such as chlorine, bromine, or a nitro group, on the aromatic nucleus can also be used provided only that the substituent is non-reactive under the reaction conditions. The preferred arylsulfonyl radical is the p-toluenesulfonyl radical because the compounds formed are generally well defined crystalline solids and because it has been found that higher yields of amines are often formed when splitting a p-toluenesulfonylamino compound using hydrogen bromide than when splitting certain other arylsulfonyl derivatives of the same amino compound. It should be mentioned, furthermore, that the method involved in the present invention can be carried out and the corresponding intermediate and final compounds prepared using starting compounds wherein the arylsulfonyl group is replaced by an alkylsulfonyl, aralkylsulfonyl or cycloalkylsulfonyl group, such as the methanesulfonyl, alpha-toluenesulfonyl or cyclohexylsulfonyl radicals, respectively.

Although the benzoic acid ester or glutamic acid ester residues present in the compounds of the invention can comprise an alkyl ester, such as the methyl, ethyl, n-propyl, iso-propyl, n-butyl, tert.-butyl, amyl, lauryl, dodecyl and many other esters, the preferred ester is the ethyl ester due to matters of convenience and economy.

Although the invention is directed particularly, in case of esters of the glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

As mentioned previously, compounds having the formula R″H (VII) which can be reacted with the N-(2,3-epoxypropyl)-p-aminobenzoate compounds (IV) to form the corresponding N-(3-oxy-2-hydroxypropyl)-p-aminobenzoate compounds (III) comprise water and the alcohols, phenols and carboxylic acids. Alcohols which can be used include the alkanols, such as methanol, ethanol, propanol, iso-propanol, n-butanol, tert-butanol, pentanol, dodecanol and many others, the aralkanols, such as benzyl alcohol, p-tolyl-carbinol, xylyl-carbinol, naphthyl-carbinol, phenyl ethanol and many others, and the cycloalkanols and cycloalkylkanols, such as cyclohexanol, methylcyclohexanol and cyclohexylcarbinol. The preferred alkanol and aralkanol are ethanol and benzyl alcohol, respectively, due to their ready availability and low cost.

Phenols which can be used include phenol, the cresols, the xylenols, the naphthols and many others. Carboxylic acids which can be used include the saturated aliphatic acids, such as formic, acetic, propionic, butyric, iso-butyric, valeric and many others, and the aromatic acids, such as benzoic, toluic, salicylic and naphthoic acids. Unsaturated acids, such as acrylic and cinnamic acids, can also be used, if desired. It should be mentioned, furthermore, that compounds having the formula R″H wherein R″ includes a substituent on an alkyl, aryl, aralkyl or acyl group which is non-reactive under the reaction conditions can also be used, if desired. Such non-reactive constituents include the halogens, hydrocarbon radicals, nitro groups and many others.

As mentioned previously, p-aminobenzoate compounds having the formula (VI) which can be used in the process include those wherein $n$ is zero, i. e. p-aminobenzoic acid, the arylsulfonyl-p-aminobenzoic acids and alkyl esters thereof, and also those wherein $n$ is an integer from 1 to 7, inclusive, such as N′-(p-aminobenzoyl)-glutamic acid, N′-(p-aminobenzoyl)-gamma-glutamylglutamate, N′-(arylsulfonyl-p-aminobenzoyl)-gamma-glutamyl-gamma-glutamylglutamate and their alkyl esters, such as the methyl, ethyl, propyl, iso-propyl, n-butyl, tert-butyl, amyl and lauryl esters.

The p-aminobenzoate compounds wherein $n$ is an integer from the group 1 to 7, inclusive, can be obtained by the method described and claimed in a concurrently filed co-pending application, Serial No. 41,888. According to the method of the co-pending application, a p-aminobenzoate compound having one glutamic acid residue in the molecule is prepared by reacting glutamic acid or an alkyl ester thereof with an arylsulfonyl-p-aminobenzoyl halide or with a p-nitrobenzoyl halide. The halides referred to in this connection are the chlorides and the bromides. When a p-nitrobenzoyl halide is used, an N′-(p-nitrobenzoyl)-glutamic acid or ester is first obtained which, upon reduction, e. g. with hydrogen using platinum oxide as a catalyst, yields an N′-(p-aminobenzoyl)-glutamic acid or ester. The latter compound can be converted readily by means of an arylsulfonyl halide to an N′-(arylsulfonyl-p-aminobenzoyl)-glutamic acid or ester. When an arylsulfonyl-p-aminobenzoyl halide is reacted with glutamic acid or its ester, an N′-(arylsulfonyl-p-aminobenzoyl)-glutamic acid or ester is formed directly. The latter compound can, if desired, be treated with hydrogen bromide and a bromine acceptor, such as phenol or catechol, in an aliphatic acid medium to split the arylsulfonyl radical from the molecule and form an N′-(p-aminobenzoyl)-glutamic acid or its ester according to the method described and claimed in the concurrently filed co-pending application, Serial No. 41,883, and now U. S. Patent No. 2,562,222, issued July 31, 1951, mentioned previously. Furthermore, the N′-(p-aminobenzoyl)-glutamic acid and the N′-(arylsulfonyl-p-aminobenzoyl)-glutamic acids can, if desired, be converted to the corresponding alkyl esters, e. g. by treatment with an alkanol and an esterification catalyst in known manner, or the esters can be hydrolyzed to the corresponding acids. In similar manner, other p-aminobenzoate compounds can be prepared having up to seven glutamic acid residues in the molecule by starting with the corresponding gamma-glutamylglutamic acids or esters containing the requisite number of peptide linkages.

The reaction of an epihalohydrin with a p-aminobenzoate compound can be carried out conveniently by heating a mixture of the substances, preferably with agitation and with the addition of a small proportion of pyridine, quinoline, triethyl amine, tributyl amine or other tertiary amines to the mixture to catalyst the reaction. A vigorous reaction generally takes place upon the addition of the amine and after a short time the mixture can be cooled and the excess of the epihalohydrin volatilized under reduced pressure. The residue consisting of the N-(3-halo-2-hydroxypropyl)-p-aminobenzoate compound is usually obtained sufficiently pure for use in further experiments without additional purification. Certain of the compounds thus obtained are solids which can be purified by recrystallization, e. g. from dilute alcohol or benzene, and which are only very slightly soluble in water.

The reaction of an N-(3-halo-2-hydroxypropyl)-p-aminobenzoate compound to form a N-(2,3-epoxypropyl)-p-aminobenzoate compound can be carried out by refluxing a mixture of water and the halogen compound and adding alkali slowly to the mixture so as to avoid any appreciable degree of alkalinity. Organic solvents such as alcohol or methyl ethyl ketone can be included in the mixture to increase the solubility of the reactants, if desired.

The formation of the epoxy compound is usually substantially complete after for from about one-half to about one hour of refluxing, depending upon the particular alkali used and the rate of addition thereof, and the mixture can then be worked up in any appropriate manner to recover the epoxy compound. In the case of epoxy compounds which are acids, the mixture can be poured into water and the epoxy acids, which are usually well defined crystalline solids, can be recovered by filtering and, if desired, purified by crystallizing from dilute ethanol or the like. In the case of epoxy esters which frequently are obtained as oily products the epoxy compounds can be recovered by evaporating the mixture to dryness in vacuo, dissolving the residue in ether and, after washing the ethereal solution with water or aqueous sodium bicarbonate to remove inorganic salts and acids volatilizing the ether. The epoxy ester is thus obtained as an oily residue of sufficient purity for most uses.

The conversion of an N-(2,3-epoxypropyl)-p-aminobenzoate compound to an N-(3-oxy-2-hydroxypropyl)-p-aminobenozate compound is effected as mentioned previously by reacting the epoxy compound with water, an alkanol, a phenol, or a carboxylic acid. The reaction conditions are governed to some extent by the particular reagent used but in general involve treating the epoxy compound with the other reactant either at ordinary or somewhat elevated temperature and, in some instances, with the addition of an agent favoring the reaction either catalytically or by reacting with one of the reaction products to shift the equilibrium in the desired direction.

Treatment of an N-(2,3-epoxypropyl)-p-aminobenzoate compound with water in the form of dilute aqueous sulfuric acid and at slightly elevated temperature, e. g. at from about 70° to about 125° C. or higher, opens the oxide linkage without splitting arylsulfonyl radicals or without hydrolyzing ester groups which may be present. It has been noted that when using aqueous hydrogen halides, a mixture of a dihydroxypropyl and a 3-halo-2-hydroxypropyl compound is obtained while when using a hydrogen halide in an anhydrous medium, e. g. in ether, the epoxy compound is reconverted in high yield to the N-(3-halo-2-hydroxypropyl)-p-aminobenzoate compound.

When using dilute aqueous sulfuric acid, the dihydroxy compound can be isolated readily by extracting the aqueous acid mixture with a water-immiscible solvent such as ether or benzene and, after drying the extract, evaporating the solvent to leave the N-(2,3-dihydroxypropyl)-p-aminobenzoate compound as a residue. It should be mentioned, also, that treatment of an N-(2,3-epoxypropyl)-p-aminobenzoate compound with an aqueous alkali generally effects hydrolysis of any carboxylic ester radicals without serious disturbance of the epoxy radical and this serves as an effective method for making the epoxy acids from their esters.

Reaction of an N-(2,3-epoxypropyl)-p-aminobenzoate compound with an organic acid is carried out by heating a mixture of the epoxy compound and the organic acid, usually without the addition of a solvent and usually with the addition of a small amount of pyridine or other tertiary amine to catalyze the reaction. Heating is generally carried out at moderately elevated temperatures, e. g. at from about 50° to about 150° C. depending upon the particular reagents used, and the heating is usually continued for two or three hours. The mixture gradually thickens so that it is difficult to stir and it is finally cooled and can either be used directly in a subsequent reaction or treated to purify the acyloxy compound.

Purification can be effected in any convenient way, e. g. by dissolving the reaction mixture in butanol and diluting the mixture with hexane until it becomes opalescent. Upon seeding and allowing the mixture to stand, crystals of the desired acyloxy compound separate and can be recovered by filtering. Certain of the acyloxy compounds are crystalline solids which can be recrystallized from ethanol or butanol. The acyloxy compounds can be hydrolyzed by agitating them with water and adding an alkali at a rate sufficient to just neutralize the organic acid formed by splitting of the acyloxy radical from the molecule to form the corresponding N-(2,3-dihydroxypropyl)-p-aminobenzoate compounds. Ester groups present in other parts of the molecule are also generally hydrolyzed at the same time.

Reaction of an N-(2,3-epoxypropyl)-p-aminobenzoate compound with an alcohol or a phenol to form the corresponding alkoxy, aryloxy, or aralkoxy compound can be carried out by treating the epoxy compound, preferably in an anhydrous medium, with an alkali metal salt of an alcohol or phenol or with the free alcohol or phenol and stannic chloride. Reaction using a salt of an alcohol or phenol occurs readily and is usually complete in from one to several hours at ordinary room temperature or at slightly elevated temperatures. The addition of a catalyst, such as pyridine, is frequently effective in hastening the action but is not essential. The reaction medium can conveniently be an excess of the alcohol or phenol or it can comprise an inert solvent for the epoxy compound, such as cyclohexane, benzene or ether.

The alkoxy, aryloxy or aralkoxy compound can be recovered readily and usually in crystalline form by diluting the reaction mixture with water and extracting the mixture with a water-immiscible organic liquid, such as benzene or ether. Upon drying the extract and evaporating the solvent, the desired compound is obtained as a residue which can be purified by recrystallization, e. g. from ethanol or methanol. By careful hydrolysis, ester groups present in the alkoxy, aryloxy or aralkoxy compound can be hydrolyzed and the corresponding acids prepared.

Certain advantages of the invention are apparent from the following examples which are given by way of illustration only and are not to be construed as limiting.

*Example 1.—Diethyl N'-(p-nitrobenzoyl)-1-glutamate*

One hundred eleven grams of p-nitrobenzoyl chloride was added at about 0° C. over a period of about one hour to a solution of 95.8 grams of crude diethyl 1(+)-glutamate hydrochloride and 80 milliliters of pyridine in 200 milliliters of benzene. The mixture was stirred for five hours, extracted first with dilute hydrochloric acid and then with aqueous sodium bicarbonate and the benzene removed under reduced pressure. The residue consisted of 110 grams of a pasty, neutral fraction consisting largely of diethyl N'-(p-nitrobenzoyl) - 1 - glutamate. After recrystallization from dilute ethanol, the ester melted at 93° to 95° C. It had a specific rotation of $(\alpha)_D^{25} = -18°$ in 95 per cent ethanol. The sodium bicarbonate extract upon acidification yielded 42 grams of p-nitrobenzoic acid.

*Example 2.—Diethyl N'-(p-aminobenzoyl)-1-glutamate*

Crude diethyl N'-(p-nitrobenzoyl)-1-glutamate prepared as in Example 1 was dissolved in ethanol and reduced with hydrogen under a pressure of about 40 pounds per square inch using platinum oxide as a catalyst. The mixture was then filtered to recover platinum and the ethanol evaporated under reduced pressure. There was thus obtained a 52 per cent yield of diethyl N'-(p-aminobenzoyl)-1-glutamate melting at 135° to 138° C. Upon recrystallization from dilute ethanol, the ester melted at 140° to 141° C. and had a specific rotation $(\alpha)_D^{25} = -9.5$ in 95 per cent ethanol.

Anal. Calcd. for $C_{16}H_{22}O_5N_2$: C, 59.6; H, 6.9; N, 8.7
Found: C, 59.6; H, 6.8; N, 9.0

*Example 3.—N'-(p-nitrobenzoyl)-1-glutamic acid*

Eighteen and one-half grams of p-nitrobenzoyl chloride was added over a period of 0.5 hour to a solution prepared by dissolving 18.5 grams of 1(+)-glutamic acid hydrochloride in a suspension of 42 grams of sodium bicarbonate in 200 milliliters of water. After stirring at 40° to 45° C. for two hours, the solution was filtered, acidified and extracted with ether. The ether was evaporated and the residue crystallized from water. There was thus obtained 19.6 grams of N'-(p-nitrobenzoyl)-1-glutamic acid melting at 110° to 114° C. and having a specific rotation $$(\alpha)_D^{25} = -9.0°$$

in 95 per cent ethanol. Esterification of the acid with ethanol and hydrogen chloride gives the diethyl ester of Example 1.

*Example 4.—N'-(p-aminobenzoyl)-1-glutamic acid*

N'-(p-nitrobenzoyl)-1-glutamic acid was dissolved in ethanol and reduced with hydrogen under a pressure of 40 pounds per square inch using platinum oxide as a catalyst. The reduced solution was filtered to recover platinum and evaporated to dryness. The residue consisted of a 70 per cent yield of crude N'-(p-aminobenzoyl)-1-glutamic acid melting at 156° to 163° C.

*Example 5.—diethyl N'-(p - toluenesulfonyl - p-aminobenzoyl)-1-glutamate*

A mixture of 407 grams of p-toluenesulfonyl-p-aminobenzoic acid and 3,450 milliliters of toluene was dried by distilling the mixture until 350 milliliters of distillate had been collected. A few drops of pyridine and 50 milliliters of thionyl chloride was then added to the dry toluene solution and the mixture stirred and refluxed for one-half hour. The solution was then cooled with agitation for two hours and the solid which precipitated was recovered by filtering and washing with toluene and then with mixed hexanes and drying. There was thus obtained 387 grams of p-toluenesulfonyl-p-aminobenzoyl chloride melting at 141° to 142° C.

A mixture of 48 grams of diethyl 1(+)-glutamate hydrochloride, 68 grams of p-toluenesulfonyl-p-aminobenzoyl chloride, 19 grams of magnesium oxide, 250 milliliters of ethylene dichloride and 100 milliliters of water was stirred with cooling for about 4 hours. The mixture was filtered and the organic layer was separated from the filtrate and washed successively with water, ice cold dilute hydrochloric acid, water and dilute aqueous sodium bicarbonate. The washed organic layer was then dried and diluted with mixed hexanes until slightly turbid and allowed to crystallize. Upon filtering the mixture, there was obtained 78 grams of diethyl N'-(p-toluenesulfonyl-p-aminobenzoyl)-1-glutamate melting at 125° to 126° C. and having a specific rotation $(\alpha)_D^{25} = -13.2°$ in a mixture of 5 per cent methanol and 95 per cent of 95 per cent ethanol. The diester is hydrolyzed readily with dilute sodium hydroxide to form N'-(p-toluenesulfonyl - p - aminobenzoyl)-1-glutamic acid.

*Example 6.—Diethyl N'-(N-(3-chloro-2-hydroxypropyl)-p-toluenesulfonyl - p - aminobenzoyl)-glutamate*

A mixture of 2.85 grams of diethyl N'-(p-toluenesulfonyl-p-aminobenzoyl)-glutamate and 1.1 grams of epichlorohydrin was agitated at 135° C. Two drops of pyridine were added and agitation at 135° C. was continued for five minutes. The excess epichlorohydrin was volatilized under reduced pressure. The residue which consisted of diethyl N'-(N-(3-chloro - 2 - hydroxypropyl)-p-toluenesulfonyl-p-aminobenzoyl)-glutamate was used in subsequent experiments without further purification.

Diethyl N'-(N-(3-bromo-2-hydroxypropyl)-p-toluenesulfonyl - p - aminobenzoyl)-glutamate is prepared in similar fashion using epibromohydrin instead of epichlorohydrin.

*Example 7.—Ethyl N-(3-chloro-2-hydroxypropyl)-p-toluenesulfonyl-p-aminobenzoate*

A mixture of five grams of ethyl p-toluenesulfonyl-p-aminobenzoate and 3.4 milliliters of epichlorohydrin was heated at 135° C. and two drops of pyridine added. A vigorous action ensued and after five minutes the mixture was cooled, dissolved in 50 milliliters of ethanol and treated three times with decolorizing carbon. The ethyl N-(3-chloro-2-hydroxypropyl)-p-toluenesulfonyl-p-aminobenzoate which remained upon volatilization of the ethanol and excess epichlorohydrin in vacuo was used in subsequent reactions without further purification.

*Example 8.—Ethyl N-(2,3-epoxypropyl)-p-toluenesulfonyl-p-aminobenzoate*

Sufficient 10 per cent aqueous sodium hydroxide was added drop-wise to a boiling alcoholic solution of ethyl N-(3-chloro-2-hydroxypropyl)-p-toluenesulfonyl - p - aminobenzoate containing three drops of phenolphthalein indicator solution to just maintain a permanent pink color. When no more alkali was required, the solution was diluted with water and filtered. There was thus obtained 4.1 grams of ethyl N-(2,3-epoxypropyl)-p-toluenesulfonyl-p-aminobenzoate as a residue melting at 69° to 71° C. Upon recrystallization from dilute ethanol, the compound melted at 71° to 72° C.

Anal. Calcd. for $C_{19}H_{21}O_5NS$: C, 60.8; H, 5.6; N, 3.7
Found: C, 59.9; H, 5.8; N, 3.7

Example 9.—N-(2,3-epoxypropyl)-p-toluene-sulfonyl-p-aminobenzoic acid

A solution of five grams of the ethyl N-(2,3-epoxypropyl)-p-toluenesulfonyl - p - aminobenzoate and 0.56 gram of potassium hydroxide in a mixture of sixteen milliliters of water and forty milliliters of dioxane was warmed at 60° C. for one hour. The solution was then cooled, diluted with water and extracted with ether to remove any unreacted ester. The extracted solution was then acidified carefully with dilute sulfuric acid and the mixture filtered. There was thus obtained 3.69 grams of N-(2,3-epoxypropyl)-p-toluenesulfonyl-p-aminobenzoic acid in the form of white crystals melting at 110° to 119° C. After one recrystallization from dilute ethanol, the compound melted at 124° to 127° C. The compound, when analyzed by the method of Nicolot and Poulter (J. Am. Chem. Soc., 52, 1186 (1930)) reacted with substantially the theoretical amount of hydrogen chloride required for the pure epoxy acid.

Example 10.—Diethyl N'-(N-(2,3-epoxypropyl)-p-toluenesulfonyl-p-aminobenzoyl) glutamate A mixture consisting of about 1.3 grams of diethyl N'-(N-(3-chloro - 2 - hydroxypropyl)-p-toluenesulfonyl-p-aminobenzoyl)-glutamate, 20 milliliters of methyl ethyl ketone, 0.17 gram of sodium bicarbonate and 3 milliliters of water was refluxed for 40 minutes. The methyl ethyl ketone and water were then distilled in vacuo and the residue taken up in a mixture of ether and water containing a small proportion of alcohol. The ether layer was separated, washed with cold dilute sulphuric acid then with water and saturated sodium bicarbonate solution and finally twice with water and once with saturated sodium chloride solution. The washed solution was filtered through anhydrous sodium sulfate and the ether distilled in vacuo. The residue consisted of 0.98 gram of diethyl N'-(N-(2,3-epoxypropyl)-p-toluenesulfonyl-p-aminobenzoyl)-glutamate in the form of a light brown oil. This is a yield of 87.5 per cent of the theoretical amount.

The epoxypropyl compound obtained as just described and other epoxy compounds described in the examples were assayed for epoxy content by the following procedure: One gram of the epoxy compound was dissolved in five milliliters of absolute ethanol and 20 milliliters of a 0.1 to 0.15 normal standardized solution of hydrogen chloride in ether was added. After standing at room temperature for 2 hours, 30 to 40 milliliters of water was added to the mixture and the unreacted hydrogen chloride titrated with standardized alkali. The hydrogen chloride consumed was a measure of the amount of epoxy compound present. When analyzed in this manner, the crude epoxypropyl compound was shown to contain 49.4 per cent of epoxy compound.

When the above procedure was carried out using dilute ethanol instead of methyl ethyl ketone, there was obtained a 75 per cent yield of product which upon assay for epoxy content proved to be 80 per cent pure diethyl N'-(N-(2,3-epoxypropyl) - p - toluenesulfonyl-p-aminobenzoyl)-glutamate.

When the procedure was carried out using anhydrous potassium carbonate and anhydrous methyl ethyl ketone there was obtained a 72 per cent yield of product which upon assay was found to contain 42.8 per cent of diethyl N'-(N-(2,3-epoxypropyl) - p - toluenesulfonyl-p-aminobenzoyl)-glutamate.

Example 11.—Ethyl N-(2,3-epoxypropyl)-p-toluenesulfonyl-p-aminobenzoate

In a manner similar to that described in Example 10 ethyl N-(3-chloro-2-hydroxypropyl)-p-toluenesulfonyl-p-aminobenzoate was treated with anhydrous potassium carbonate in anhydrous methyl ethyl ketone. The mixture was refluxed two hours. From the mixture there was isolated a product containing 33 per cent of ethyl N - (2,3 - epoxypropyl) - p - toluenesulfonyl-p-aminobenzoate.

When the process was repeated using sodium bicarbonate and dilute ethanol instead of anhydrous potassium carbonate and anhydrous methyl ethyl ketone and the mixture refluxed for thirty minutes, the crude product obtained contained 46.4 per cent of ethyl N-(2,3-epoxypropyl)-p-toluenesulfonyl-p-aminobenzoate.

Example 12.—Ethyl N - (3 - chloro - 2 - hydroxypropyl) - p - toluenesulfonyl - p - aminobenzoate A mixture of 16 grams of ethyl N-(2,3-epoxypropyl) - p - toluenesulfonyl - p - aminobenzoate, 12 grams of pyridine hydrochloride, 100 milliliters of ethanol and 10 milliliters of water was refluxed for 30 minutes. The mixture was then concentrated by distilling 70 milliliters of aqueous ethanol from it and the residual solution was diluted with water. The precipitate which formed was recovered by filtering and washing with water and then dried. There was thus obtained 12.6 grams of crude crystalline ethyl N-(3-chloro - 2 - hydroxypropyl) - p - toluenesulfonyl-p-aminobenzoate melting at 77° to 81° C. Recrystallization of the product from dilute ethanol gave crystals melting at 85° to 86° C.

Example 13.—N - (3 - chloro - 2 - hydroxypropyl) - p - toluenesulfonyl - p - aminobenzoic acid A solution of 2.01 grams of recrystallized N-(2,3 - epoxypropyl) - p - toluenesulfonyl - p-aminobenzoic acid in 30 milliliters of 0.57 normal hydrochloric acid in ether was stirred at room temperature for about two hours. Crystals separated from the mixture during the period of stirring. After removing most of the ether in vacuo, the crystals were recovered by filtering and drying. There was thus obtained 1.65 grams of N - (3 - chloro - 2 - hydroxypropyl) - p - toluenesulfonyl-p-aminobenzoic acid in the form of crystals melting at 157° to 161° C.

Example 14.—Ethyl N - (3 - benzoxy - 2 - hydroxypropyl) - p - toluenesulfonyl - p - aminobenzoate A mixture of 1.88 grams of ethyl N - (2,3-epoxypropyl) - p - toluenesulfonyl - p - aminobenzoate and 0.61 gram of benzoic acid was heated at 120° C. and 1 drop of pyridine added to the agitated melt. Heating was continued for about two hours, the melt becoming so thick after about fifteen minutes that it could no longer be stirred. Upon cooling, the melt hardened to a glass-like solid. The reaction mixture was dissolved in 20 milliliters of n-butanol and the solution diluted with mixed hexanes until it became opalescent. The solution was allowed to stand at room temperature for three days and the crystals which separated were recovered by filtering, washing with a butanol-hexane mixture and drying in vacuo over sulfuric acid. There was thus obtained 1.56 grams of ethyl N - (3 - benzoxy - 2 - hydroxypropyl) - p - toluenesulfonyl-p-aminobenzoate which after crystallizing twice from n-butanol melted at 133.5° to 135.5° C.

Anal. Calcd. for $C_{26}H_{27}O_7NS$: C, 62.76; H, 5.47
Found: C, 62.38; H, 5.28

*Example 15.—Ethyl N - (3 - formoxy - 2 - hydroxypropyl) - p - toluenesulfonyl - p - aminobenzoate*

A mixture consisting of 11.1 grams of ethyl N-(2,3 - epoxypropyl) - p - toluenesulfonyl - p-aminobenzoate, 1.57 grams of formic acid and 3 drops of pyridine was heated at about 100° C. with stirring for two hours. The reaction mixture which contained ethyl N - (3 - formoxy - 2-hydroxypropyl) - p - toluenesulfonyl - p - aminobenzoate was oxidized without isolation of the ester directly to the corresponding 2-ketopropyl compound.

*Example 16.—Ethyl N - (3 - methoxy - 2 - hydroxypropyl) - p - toluenesulfonyl - p - aminobenzoic acid*

A mixture of 1.1 grams of ethyl N - (2,3-epoxypropyl) - p - toluenesulfonyl - p - aminobenzoate, 12 milliliters of methanol and 0.34 gram of sodium methoxide was allowed to stand at room temperature for 3 hours and then refluxed for 1 hour. The mixture was then cooled, diluted with water and extracted with 10 milliliters of ether. Acidification of the extracted aqueous solution with hydrochloric acid gave a precipitate which, after filtering and drying, consisted of 0.94 gram of N - (3 - methoxy - 2 - hydroxypropyl) - p-toluenesulfonyl - p - aminobenzoic acid melting at 152° to 158° C. After recrystallization from methanol, the product melted at 157° to 159° C. It had a neutral equivalent of 360 as compared with the calculated value of 379.

*Example 17.—Diethyl N' - (N - (3 - phenoxy - 2-hydroxypropyl) - p - toluenesulfonyl - p-aminobenzoyl) - 1 - glutamate*

A mixture of 14.3 grams of diethyl N' - (p-toluenesulfonyl - p - aminobenzoyl) - 1 - glutamate, 4.5 grams of 1,2-epoxy-3-phenoxypropane and 3 drops of pyridine was heated at 140° C. for 30 minutes and then cooled. The viscous mass was dissolved in benzene and the solution washed with dilute mineral acid and then with water and dried over sodium sulfate. Volatilization of the benzene in vacuo gave 19.7 grams of diethyl N' - (N - (3 - phenoxy - 2 - hydroxypropyl) - p - toluenesulfonyl - p - aminobenzoyl)-1-glutamate as a viscous, yellow oil.

*Example 18.—N - (2,3 - dihydroxypropyl - p-toluenesulfonyl - p - aminobenzoic acid*

A mixture was prepared consisting of 7 milliliters of dioxane, 3 milliliters of water and 1.88 grams of ethyl N - (2,3-epoxypropyl) - p - toluenesulfonyl - p - aminobenzoate. Two drops of concentrated sulfuric acid was added and the mixture was heated at 100° to 110° C. for 21 hours and then concentrated to a syrup consisting of ethyl N - (2,3 - dihydroxypropyl) - p - toluenesulfonyl-p-aminobenzoate. The syrup was dissolved in five milliliters of 95 per cent ethanol and mixed with a solution of 1.3 grams of potassium hydroxide in 10 milliliters of 95 per cent ethanol. The mixture was refluxed for 30 minutes and cooled and the crystals which separated were recovered by filtering. The crystals were then dissolved in 8 milliliters of water and the solution acidified with dilute hydrochloric acid. A syrup separated which soon crystallized and which was then recovered by filtering, washing with water and drying in vacuo. There was thus obtained 1.3 grams of N - (2,3 - dihydroxypropyl) - p - toluenesulfonyl - p - aminobenzoic acid melting at 171° to 172° C. Recrystallization of the product twice by dissolving it in ethanol and diluting with water gave a pure product melting at 172° to 174.5° C.

Anal. Calcd. for $C_{17}H_{19}NSO_6$: C, 55.88; H, 5.24; N, 3.83
Found: C, 55.87; H, 5.25; N, 3.77

In similar manner N - (2,3 - dihydroxypropyl)-p-aminobenzoic acid is prepared by heating a mixture of N-(2,3-epoxypropyl)-p-aminobenzoic acid, dioxane and water containing a small proportion of sulfuric acid. The compound melts at 189° to 190° C.

Anal. Calcd. for $C_{10}H_{12}NO_4$: C, 56.9; H, 6.20; N, 6.64
Found: C, 57.2; H, 6.04; N, 6.75

*Example 19. — N-(2,3-dihydroxypropyl)-p-toluenesulfonyl-p-aminobenzoic acid*

A solution of 1 gram of ethyl N-(3-acetoxy-2-hydroxypropyl) - p - toluenesulfonyl-p-aminobenzoate in 15 milliliters of ethanol and 20 milliliters (about 4 molar proportions) of 0.5 normal aqueous sodium hydroxide solution was warmed at 60° to 65° C. for 1 hour. The solution was then cooled, diluted with 100 milliliters of water and acidified. The crystals which separated were recovered by filtering and drying. There was thus obtained 0.82 gram of N-(2,3-dihydroxypropyl) - p - toluenesulfonyl-p-aminobenzoic acid melting at 166° to 172° C. Recrystallization from isopropanol gave a product melting at 170° to 173° C.

The same compound is obtained using N-(3-acetoxy - 2 - hydroxypropyl)-p-toluenesulfonyl-p-aminobenzoic acid instead of the ester, as is also the case using the 3-formoxy, 3-butroxy, or 3-valeroxy, acids instead of the 3-acetoxy acid.

We claim:

1. The method which includes: heating a compound having the formula

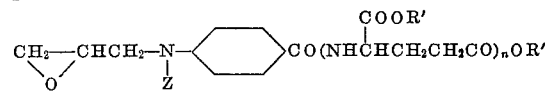

wherein R' is from the group consisting of hydrogen and the alkyl radicals, n is from the group consisting of zero and the positive integer 1 and Z is from the group consisting of hydrogen and the arylsulfonyl radicals with a compound having the formula R''H wherein R'' is selected from the group consisting of radicals having the formulae HO—, HCOO, alkyl-COO—, aryl-COO—, alkyl-O— and aryl-O—, to open the epoxy ring and form a compound having the formula

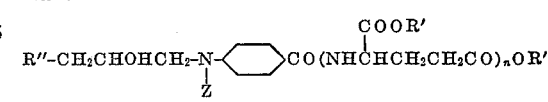

wherein R', n, Z and R'' have the values given.

2. The method which includes: heating ethyl N - (2,3 - epoxypropyl) - p - toluenesulfonyl-p-aminobenzoate with water to open the epoxy ring and form ethyl N-(2,3-dihydroxypropyl)-p-toluenesulfonyl-p-aminobenzoate.

3. The method which includes: heating ethyl

N - (2,3 - epoxypropyl) - p - toluenesulfonyl-p-aminobenzoate with benzoic acid to open the epoxy ring and form ethyl N-(3-benzoxy-2-hydroxypropyl) - p - toluenesulfonyl - p-aminobenzoate.

4. The method which includes: heating ethyl N - (2,3 - epoxypropyl) - p - toluenesulfonyl - p-aminobenzoate with methanol in alkaline solution to open the epoxy ring and form N-(3-methoxy - 2 - hydroxypropyl) - p - toluenesulfonyl-p-aminobenzoic acid.

5. The method which includes: heating ethyl N - (2,3 - epoxypropyl) - p - toluenesulfonyl-p-aminobenzoate with formic acid to open the epoxy ring and form ethyl N-(3-formoxy-2-hydroxypropyl) - p - toluenesulfonyl-p-aminobenzoate.

6. A compound having the formula

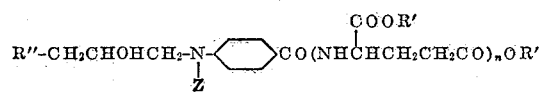

wherein R' is from the group consisting of hydrogen and the alkyl radicals, $n$ is from the group consisting of zero and the integer 1, Z is from the group consisting of hydrogen and the arylsulfonyl radicals and R'' is selected from the group consisting of radicals having the formulae HO—, aryl-COO—, and aryl-O—.

7. N - (2,3 - dihydroxypropyl) -p-aminobenzoic acid.

8. Ethyl N - (2,3-dihydroxypropyl) -p-toluenesulfonyl-p-aminobenzoate.

DAVID I. WEISBLAT.
BARNEY J. MAGERLEIN.
DONALD R. MYERS.
STANLEY T. ROLFSON.
ARTHUR R. HANZE.

REFERENCES CITED

The following references are of record in the file of this patent:

UNITED STATES PATENTS

| Number | Name | Date |
|---|---|---|
| 610,348 | Einhorn | Sept. 6, 1898 |
| 647,263 | Heymann | Apr. 10, 1900 |
| 1,977,253 | Stallman | May 12, 1933 |
| 2,442,836 | Angier | June 8, 1948 |
| 2,443,165 | Hultquist | June 8, 1948 |
| 2,457,109 | Boothe | Dec. 28, 1948 |
| 2,472,482 | Hultquist | June 7, 1949 |
| 2,476,360 | Doub | July 19, 1949 |

FOREIGN PATENTS

| Number | Country | Date |
|---|---|---|
| 128,552 | Great Britain | Feb. 12, 1920 |

OTHER REFERENCES

Angier, Science, vol. 103, No. 2683, pp. 667–668.

An Outline of Organic Chemistry, by Degering, 4th ed., Barnes and Noble publishers (1941), pp. 52 and 53.